Oct. 21, 1952 — W. F. MITCHELL — 2,614,830
SPRING
Filed May 25, 1948 — 2 SHEETS—SHEET 1
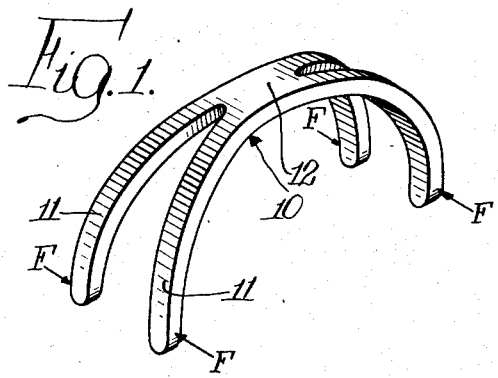
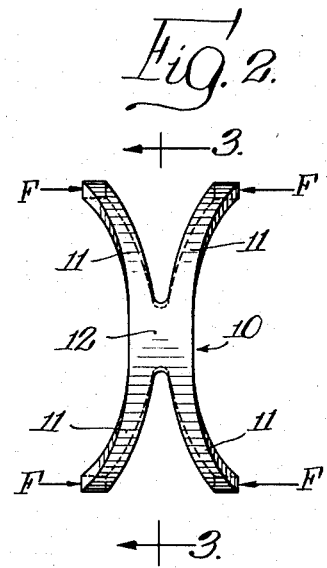
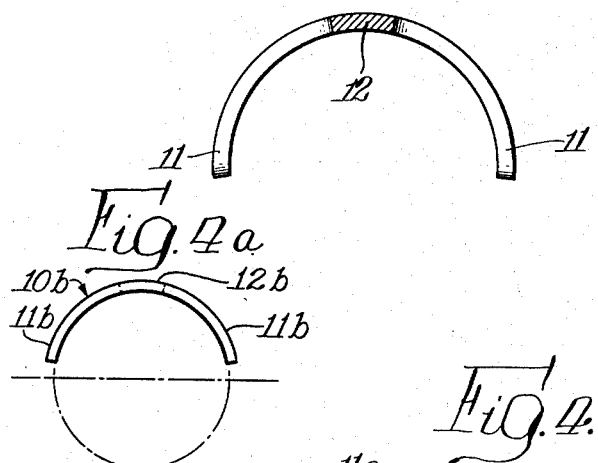
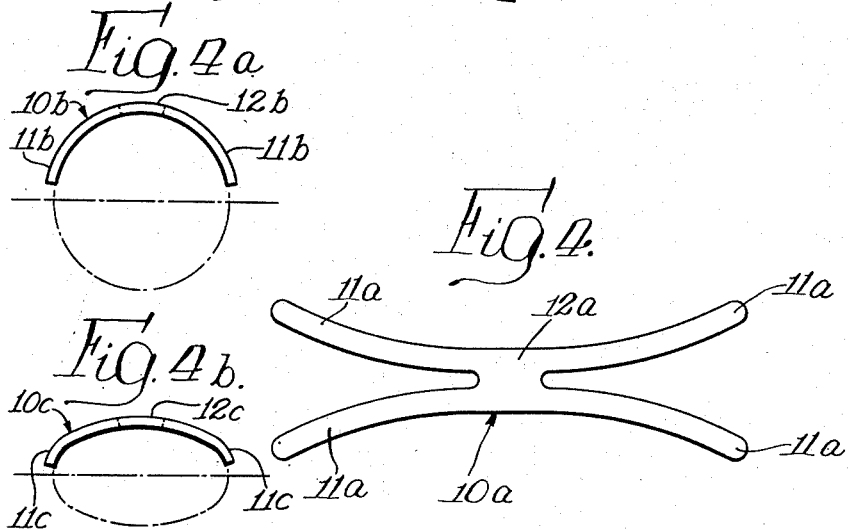
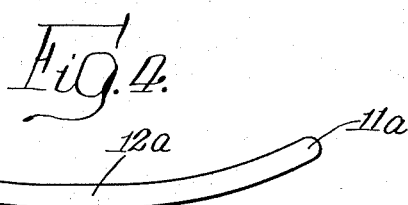
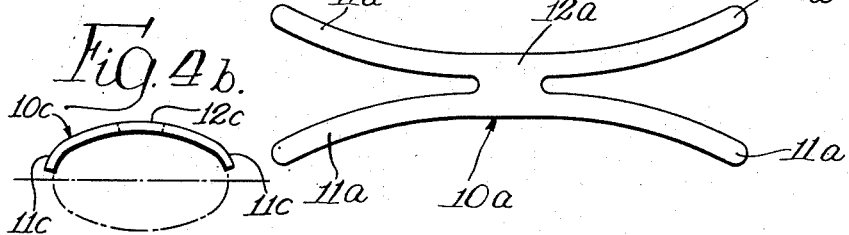
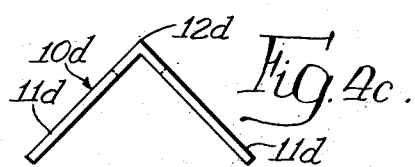
INVENTOR.
Wallace F. Mitchell,
BY
Fidler, Crouse & Beardsley
Attys Oct. 21, 1952 W. F. MITCHELL 2,614,830
SPRING
Filed May 25, 1948 2 SHEETS—SHEET 2
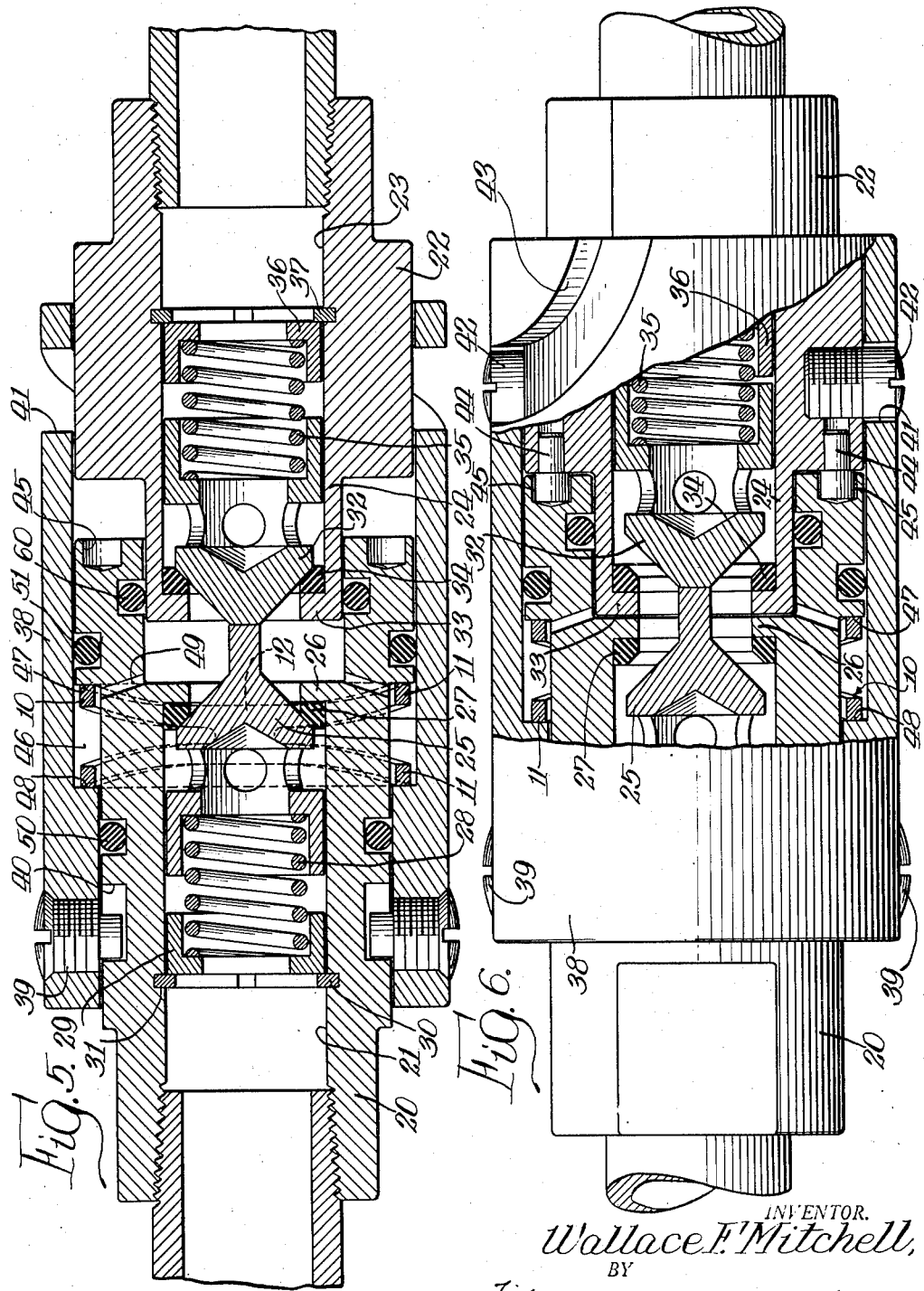
INVENTOR.
Wallace F. Mitchell,
BY
Fidler, Conee & Beardsley
Attys Patented Oct. 21, 1952

2,614,830

UNITED STATES PATENT OFFICE 2,614,830

SPRING

Wallace F. Mitchell, Chicago, Ill., assignor to M B G Corporation, Chicago, Ill., a corporation of Illinois Application May 25, 1948, Serial No. 29,031

5 Claims. (Cl. 267—1)

This invention relates to springs and has to do particularly with a spring which is capable of use in numerous applications where springs of conventional coil or leaf form have been used heretofore, and in many additional applications for which conventional types of springs are not suitable.

An object of this invention is to provide a new and improved spring.

Another object is to provide a spring suitable for use in connection with a member or members such as a rod shaft, tube, sleeve or the like, to effect or resist axial movement of the member or members and which spring is capable of exerting its force in a balanced manner with respect to the axis of the member or members against which the spring is adapted to act so that the force is exerted parallel to the axis of the member or members.

Another object is to provide a spring adapted to embrace a member such as a rod shaft, tube, sleeve or the like or to be disposed within a hollow member such as a sleeve and which is adapted to exert its force on the associated member at locations positioned on diametrically opposite sides of the axis of the member.

Another object is to provide a spring which is adapted to embrace a member such as a rod shaft, tube, sleeve or the like and which may be applied to such member from one side thereof.

Another object is to provide a relatively strong spring which may be made relatively small and compact and which is well adapted for use in applications where there is a relatively small space available for receiving the spring.

Another object is to provide a spring which may be made relatively small and compact and which at the same time may be formed to have a substantial degree of deflection under load.

A further object is to provide a spring which is capable of use in numerous applications where springs of conventional form have been used heretofore and which has a loading capacity substantially in excess of that of a conventional spring of substantially the same cross-sectional area and overall size.

A still further object is to provide a new and improved spring of extremely simple form and which may be manufactured by very simple manufacturing operations.

Other objects and advantages of the present invention will appear from the following description taken in connection with the appended drawings, wherein:

Figure 1 is a perspective view of a spring formed in accordance with one embodiment of the present invention;

Fig. 2 is a top plan view of the spring of Fig. 1;

Fig. 3 is a sectional view taken along line 3—3 of Fig. 2;

Fig. 4 is a top plan view of a blank from which the spring of Fig. 1 is formed;

Figs. 4a, 4b and 4c are reduced scale side views respectively of modified forms of springs;

Fig. 5 is a longitudinal sectional view of a hydraulic self-sealing break-away coupling embodying therein a spring formed in accordance with the present invention and illustrating one typical application of the present invention, the coupling being show in partially coupled condition; and Fig. 6 is a side elevational view of the coupling of Fig. 5 with certain of the parts being broken away and in section, the coupling being shown in full coupled condition.

The present invention has to do with a spring of novel form which is adapted for use in numerous applications where springs of conventional form have been employed heretofore. It is also suitable for use in additional applications where conventional springs cannot be used or are less suitable, either by reason of the particular configuration of the latter or because of the greater size of spring required for a given load. The spring of the present invention is especially suitable for use in connection with a member such as a rod shaft, tube or sleeve where it is desired to effect or resist axial movement of the member. Heretofore, such action has been obtained by telescoping a coil spring over or within the member, the spring being seated against an annular shoulder on or within the member. The present invention provides a spring which not only is suitable for the foregoing application but which exerts its force at locations positioned on diametrically opposite sides of the axis of the member so that the force is exerted parallel to the axis of the member and there is a balanced condition. Moreover, the spring of the present invention is of open form and is adapted to be inserted over the member from one side thereof and does not require that it be telescoped over the end of the member as is necessary where a spring of conventional coil form is employed.

Referring now particularly to Fig. 1, the spring of the present invention in the illustrative embodiment is formed as an arcuate member 10 of suitable resilient spring material. For convenience in manufacture, the spring is formed from sheet or plate material although if desired, it may be otherwise suitably formed. The spring member is of the general form illustrated in the drawings and may be considered as comprising two arcuate portions 11 lying approximately in intersecting planes, the arcuate portions 11 being integrally joined substantially at their mid-portions by a body portion 12. As will be observed from the drawings, the spring also may be considered as comprising an arcuate member having bifurcate end portions consisting of pairs of divergent arms extending therefrom.

While the spring may take various forms, as hereinafter explained, the spring of the illustrative embodiment is formed as an arc of a circle and preferably extends throughout slightly more than one-half of the circle so that the points of application of the load (indicated in Figs. 1 and 2 by the arrows "F") are located on diametrically opposite sides of the axis of the arc.

The spring is adapted to embrace or to be disposed within a cylindrical member as illustrated particularly in Figs. 5 and 6 which will be described more in detail hereinafter. The spring illustrated herein is adapted particularly for compression loading and such loading is applied at opposite ends of the spring (as indicated by the arrows "F") and in a direction parallel to the axis of the spring. The deflection of the spring under loading effects a combined torsion and bending of the arms 11 which is resisted by the resilience of the material from which the spring is formed.

The spring lends itself to formation in a very simple and economical manner and may be formed at least as easily and inexpensively as conventional types of coil springs. The spring may be formed by punching from a sheet or plate of suitable spring material, such as steel, a blank 10a such as illustrated in Fig. 4 of the drawings. The blank 10a is formed with a central body portion 12a and arcuate arms 11a extending therefrom as illustrated. To form the spring, the blank 10a is bent into an arc of a circle about an axis extending parallel to but spaced from the plane of the blank and lying in a plane passing transversely of the blank and medially thereof. Where the spring is to be formed as illustrated, the length of the spring and the radius of the curvature are so related that the spring, when bent to final form, extends through approximately 180°. After the blank is bent into the desired shape, the member is hardened and tempered to provide the desired degree of resiliency, and the spring is then ready for use.

While the spring of the present invention is capable of application in a large number of uses, it is especially well adapted for use in apparatus where it is desired to effect or resist relative axial movement between two generally cylindrical members and the loading requirements and space limitations are such that the use of a coil spring of conventional type is impractical. One such application is in a hydraulic self-sealing breakaway coupling of the type disclosed and claimed in my co-pending application Serial No. 755,134 filed June 17, 1947, now Patent No. 2,509,444, issued May 30, 1950, an embodiment of which is shown in Figs. 5 and 6 for the purpose of illustrating such an application of the spring of the present invention. As explained more fully in the said application, the coupling is adapted for use in fluid lines, such as those, for example, employed in hydraulic control systems wherein a hydraulic fluid under pressure is contained in the line. In such systems it is often desired that the line separate when an excessive tension is applied to the line, thereby preventing damage to the connected apparatus. To accomplish this, the coupling of the aforesaid application is incorporated in the line, which coupling is adapted to separate when a predetermined tension is applied to the line and, upon separation, automatically closes and seals the free ends of the line against loss of fluid.

The coupling includes a first coupling member 20 of generally cylindrical form having a passage 21 therethrough and a second coupling member 22 of generally cylindrical form having a passage 23 therethrough and a projecting portion 24 adapted to enter the open end of the coupling member 20 to place the passages 21 and 23 in communication. A sealing ring 60 is provided in the member 20 for preventing the escape of fluid when the portion 24 is in the member 20.

The coupling members 20 and 22 are provided with valves which are normally closed when the coupling members are separated, in order to prevent loss of fluid from either side of the line in which the coupling is incorporated. The valves, however, are arranged to mutually unseat each other when the coupling members are in fully coupled condition so as to open communication between the passages 21 and 23. For this purpose, a valve 25 cooperates with a valve seat 26 which may have a seating surface provided by a ring 27 of suitable plastic material such as nylon. The valve 25 is urged into closed position by a spring 28 which bears at its other end against a spring seat 29 positioned in the coupling member 20 by a split ring 30 resiliently seated in a circumferential slot 31. A generally similar valve arrangement is provided in the second coupling member 22 which includes a valve 32 cooperating with a seat 33 having a nylon ring 34. This valve is urged into closed position by a spring 35 seated in a spring seat 36 positioned by a split ring 37.

The coupling members are held in coupled position by a sleeve 38 of generally cylindrical form carried on the coupling member 20 and adapted for limited sliding movement thereon, such movement being limited by studs 39 threaded into the sleeve 38 and extending into slots 40 in the coupling member 20. The sleeve at its other end is provided with a pair of arcuate open end slots 41 adapted to receive respectively studs 42 threaded into and projecting from the second coupling member 22. The outermost wall 43 of each of the slots 41 is formed so as to provide in effect an arcuate, cam surface extending from the outer end to the inner end with the inner portion making a large angle with the axis of the sleeve and the outer end substantially parallel to the axis. The slots 41 and surfaces 43 are so formed that when a separating force is applied in an axial direction on the two coupling members, the coupling member 22 is withdrawn from the sleeve, but when the coupling member 22 is held against rotation relatively to the sleeve, about their common axis, the surface 43 resists axial movement of the coupling member 22 relatively to the sleeve 38 and the other coupling member 20.

For the purpose of preventing rotation of the coupling member 22 relatively to the sleeve 38, a plurality of pins 44 are provided which project from the inner end face of the coupling member 22 and are adapted to enter sockets 45 in the adjacent end face of the coupling member 20 when the coupling members are in fully coupled position to lock the coupling members against relative rotation. Since the sleeve is held against rotation on the coupling member 20, the other coupling member 22 when locked against rotation relatively to the first coupling member is thus held against rotation in the sleeve. As pointed out above, the coupling member 20 can move axially in the sleeve slightly, this movement being sufficient to permit the pins 44 to be disengaged from the sockets 45 and to allow the coupling member 22 to be rotated in the sleeve 38 when an axial separating force is applied to the coupling members.

The coupling members may be coupled by inserting the coupling member 22 into the sleeve 38 with the studs 42 entering the slots 41. The members are then rotated relatively in an appropriate direction whereby the cam action of the slot side wall 43 against the studs 42 draws the coupling members together and the pins 44 are rotated into position to enter the sockets 45, the coupling member 20 moving outwardly in the sleeve 38 to permit the pins to ride along the inner face of the coupling member 20 just prior to entering the sockets 45. When the coupling is in coupled condition and an axial separating force is applied to the coupling members, or the portion of the hose line in which the coupling is connected, the coupling member 20 is moved outwardly to disengage it from the pins 44 whereby the coupling member 22 is permitted to rotate and be withdrawn from the sleeve 38.

Means are provided for yieldingly maintaining the coupling member 20 in its innermost position in the sleeve, with the pins 44 engaging in the sockets 45 but which means permit sufficient axial separation of the coupling members to release the pins upon the application of a predetermined tension on the line in which the coupling is connected. To the foregoing end, an annular chamber 46 is provided which is defined between the coupling member 20 and the sleeve 38, the end walls of the chamber being constituted by shoulders 47 and 48 on the coupling member 20 and sleeve 38 respectively. Sealing rings 50 and 51 are provided between the coupling member 20 and sleeve 38. The chamber 46 is connected by a port 49 to the interior of the coupling member 20 and thus, when the coupling members are in position providing communication between their respective passages, and either or both of the valves is open, the pressure in the corresponding side of the line is established in the chamber 46 to yieldingly maintain the coupling member 20 in its forward position.

In order to insure that the coupling members are retained in coupled condition even when there may be no pressure in the line, a spring 10 such as hereinbefore described, is disposed in the annular chamber 46 and adapted to bear between the shoulders 47 and 48.

The spring and fluid pressure in the annular chamber are effective in the same sense and the coupling is so designed that the total force acting to move the member 20 inwardly exceeds the force exerted by the line pressure tending to separate the coupling members by a predetermined force. This force is that which is effective to retain the coupling locked in coupled condition and which must be overcome in order to uncouple the coupling.

The spring embraces the coupling member 20 and bears against the shoulders 47 and 48 at points located at diametrically opposite portions of the shoulders—that is to say, at points 180° apart circumferentially around the shoulders 47 and 48. Thus, there is no tendency to tilt or cant the coupling member in the sleeve. Moreover, since the spring is compact both in a longitudinal direction and in thickness of the spring arms, it is well suited for disposition in the relatively small annular space 46, the maximum dimension of which may in many instances be dictated by factors which it is not practicable to ignore, such as design or economic requirements.

While the present invention has been illustrated in connection with a spring of semi-circular form, the invention is not thus limited and the spring may take other forms. For example, in one such other form, the spring may be generally similar in shape to the spring shown in the drawings and described above, but with the spring being bent into an arc of such radius that the arc extends through less than 180°, as illustrated in Fig. 4a, wherein the reference numerals applied to the various elements correspond respectively to those applied to Fig. 1 with the suffix b added. Where this form of spring is used, it is desirable, in order to obtain a balanced spring action on the associated member, to employ two or more similar springs which are arranged equally spaced around the cylindrical associated member.

In another form, the spring, instead of being bent into the form of an arc of a circle, may be made in the form of an arc of an ellipse for association with a shaft or other member of elliptical cross-section. Such elliptical spring is illustrated in Fig. 4b, wherein the reference numerals applied to the various elements correspond respectively to those applied to Fig. 1 with the suffix c added. In this case, also, two or more springs are employed and are disposed in appropriate positions around the associated member.

It is not necessary in all cases that the spring be bent into an arc but it may, where such is desired, be bent so that the two bifurcate portions lie in separate planes extending at an angle to each other. For example, where it is desired to employ the spring with a shaft or the like of polygonal cross-section, the portions of the spring are bent at an appropriate angle. Thus, where the spring is to be used with a square shaft, the spring takes a right angular form, as illustrated in Fig. 4c, wherein the reference numerals applied to the various elements correspond respectively to those applied to Fig. 1 with the suffix d added. In this case, preferably two similar springs are employed with one spring having its bifurcated portions extending along two adjacent sides of the shaft and the other spring located oppositely so that its portions extend along the other two sides.

In certain cases, the spring may be employed with members of such form that it either is not necessary or is not practicable for the spring to embrace the associated member. In such case, the spring may be planar and takes the form of the blank illustrated in Fig. 4 of the drawings. The spring is made by merely forming the blank as above described and then hardening and tempering it, without bending. It will be seen, of course, that with this form of spring, the loading force is applied in a direction substantially in the plane of the spring and the deflection of the arms is substantially in this plane; thus, substantially the entire stress on the spring is a bending stress.

Thus, it will be seen from the foregoing that the present invention provides a novel spring which is simple in construction and may be manufactured by a relatively simple and inexpensive process. The spring has a relatively high loading capacity for any given size and cross-section and hence lends itself to application in many instances where the space available to accommodate the spring is limited.

The spring is adapted to bear at its ends against the associated member at points on diametrically opposite sides of the common axis of the spring and member and hence the spring force is exerted in a direction parallel to the axis and there is no force on the member tending to tilt or cant it. Accordingly, the spring is especially well adapted for use with associated axially slidable members which require close fitting and where any tendency to tilt might result in undue friction between or binding of the members.

The spring of the present invention is discontinuous with respect to its surrounding relation to an associated member and therefore may be assembled over the member from the side thereof and does not need to be telescoped over the end thereof. Therefore, the spring may be used in many devices where by reason of the construction of the apparatus the end of the associated member is not accessible, or where a flange or the like prevents the telescoping of a spring thereon. Also, the spring may be inserted, in many instances, in a member of sleeve form where a spring of conventional form could not because of the restricted nature of the opening in the member.

I claim:

1. A compression spring comprising an arcuate-shaped body of sheet spring material, said body having a central portion and paired, arcuately diverging arms extending symmetrically equal extents from opposite ends of said central portion, said central portion and said arms all having their inner surfaces conforming in arcuate respect with the arcuate surface of a right circular cylinder, said arms all having their respective outer ends terminating substantially on an axial plane of the cylinder and being spaced equidistant from a medial plane passing through said central portion and perpendicularly to the axis of revolution of the cylinder.

2. A compression spring comprising an arcuate-shaped body of spring material having a central portion and paired diverging arms, the respective pairs of said arms extending arcuately and symmetrically from opposite ends of said central portion, said body having its inner surface conforming in arcuate respect with the arcuate surface of a circular cylindrical surface, each of said arms having its outer edge conforming in arcuate respect with the arcuate surface of a second circular cylindrical surface, the axis of rotation of the line generating the said second cylindrical surface being perpendicular to the axis of rotation of the line generating the first said cylindrical surface, and said arms all having their outer ends terminating substantially on a plane passing through the axis of rotation of the line generating the said first cylindrical surface.

3. A compression spring comprising a body of spring material, said body having a central portion and a pair of diverging arms extending from each of the opposite ends of the central portion with the pairs arranged symmetrically, the ends of the arms extending laterally beyond the side edges of the central portion, said arms all extending on the same side of a plane having at least a lineal contact with a face of said central portion, and progressively away from said plane and from a second plane passing transversely through said central portion medially thereof and perpendicularly to the first said plane, the ends of said arms all being equidistant from said second plane, and the arms being of such cross-sectional dimensions and having substantial resilience to enable the ends of the arms of each pair to be flexed toward each other.

4. The invention as set forth in claim 3 wherein said body is arcuate and formed of resilient sheet material and conforms in arcuate respect with the arcuate surface of a right elliptic cylinder and said central portion and said arms all are disposed at one side of one of the two axial planes of the elliptic cylinder.

5. The invention as set forth in claim 3 wherein said body is arcuate and formed of resilient sheet spring material and said body is bent angularly about a medial transverse axis and each pair of arms respectively lying substantially in angularly disposed planes.

WALLACE F. MITCHELL.

REFERENCES CITED

The following references are of record in the file of this patent:

UNITED STATES PATENTS

| Number | Name | Date |
|---|---|---|
| 76,557 | Trent | Apr. 7, 1868 |
| 87,827 | Dand | Mar. 16, 1869 |
| 503,344 | Fletcher | Aug. 15, 1893 |
| 750,112 | King | Jan. 19, 1904 |
| 1,331,677 | Schachter | Feb. 24, 1920 |
| 1,541,124 | Dunham | June 9, 1925 |
| 2,219,600 | Potter | Oct. 29, 1940 |
| 2,263,949 | Harle | Nov. 25, 1941 |